United States Patent [19]

Schmid

[11] Patent Number: 4,679,601
[45] Date of Patent: Jul. 14, 1987

[54] METHOD AND AN APPARATUS FOR ACCELERATING AIR OR GAS EXCHANGE

[75] Inventor: Alfred Schmid, Schöfflisdorf, Switzerland

[73] Assignee: Bucher-Guyer AG, Niederweningen, Switzerland

[21] Appl. No.: 847,164

[22] Filed: Apr. 2, 1986

Related U.S. Application Data

[63] Continuation of Ser. No. 575,823, Feb. 1, 1984, abandoned.

[30] Foreign Application Priority Data

Mar. 31, 1983 [CH] Switzerland ................. 1803/83

[51] Int. Cl.⁴ .................. B30B 9/22; B65B 3/00
[52] U.S. Cl. .......................... 141/4; 141/98; 141/47; 141/100; 100/211; 417/197
[58] Field of Search ............... 141/4, 5, 11, 12, 54, 141/71, 98, 37–49, 100; 100/211; 417/197, 205, 206, 87, 89; 418/5

[56] References Cited

U.S. PATENT DOCUMENTS

| | | | |
|---|---|---|---|
| 2,721,694 | 10/1955 | Van Atta | 418/3 |
| 2,724,508 | 11/1955 | Luther | 100/211 X |
| 3,111,260 | 11/1963 | Brymner | 418/5 |
| 3,150,594 | 9/1964 | Coberly et al. | 417/206 |
| 3,447,467 | 6/1969 | Heinge | 417/197 X |
| 3,624,729 | 11/1971 | Hoover | 100/117 |
| 3,642,384 | 2/1972 | Huse | 417/205 |
| 3,837,377 | 9/1974 | McJones | 141/4 |
| 3,875,745 | 4/1975 | Franklin | 417/197 X |
| 4,024,810 | 5/1977 | Braun | 100/116 |
| 4,107,404 | 8/1978 | Schimd | 100/117 |
| 4,140,051 | 2/1979 | Hauser et al. | 100/116 |
| 4,151,795 | 5/1979 | Hauser | 100/117 |
| 4,309,151 | 1/1982 | Craven | 417/206 |
| 4,421,151 | 12/1983 | Stumpe | 141/46 X |
| 4,422,830 | 12/1983 | Perkins | 417/87 X |

Primary Examiner—Stephen Marcus
Assistant Examiner—Ernest G. Cusick
Attorney, Agent, or Firm—Marmorek, Guttman & Rubenstein

[57] ABSTRACT

In a method of, and an apparatus for accelerating air or gas exchange during cyclical operation of a pressure chamber with the aid of a pumping device connected to the pressure chamber, and with the aid of a compressor for at least partially compressing the air or gas, the steps include filling the pressure chamber with compressed air or gas through the compressor, thereafter discharging the air or gas from the pressure chamber, and operating the pumping device during at least one of the filling or discharging steps.

17 Claims, 2 Drawing Figures

METHOD AND AN APPARATUS FOR ACCELERATING AIR OR GAS EXCHANGE

This is a continuation of application Ser. No. 575,823, filed Feb. 1, 1984, now abondoned.

BACKGROUND OF THE INVENTION

The invention relates to a method for accelerating air- or gas-exchange, and reducing operating energy during filling and/or discharge of pressure chamber.

In a method of the aforedescribed type there arise, on one hand, uneconomic energy costs in an initial phase of the filling of the pressure chamber, until a pressure slightly above atmospheric pressure has been reached, as air or gas compressed in a compressor to a higher pressure than atmospheric pressure expands again during passage into the empty pressure chamber through a conduit. On the other hand, the use of a blower for the same purpose, although requiring less energy, requires additional time in order to reach a minimal filling degree at a considerably lower filling capability, which, in turn, has a disadvantageous effect on the efficiency of filling the pressure chamber.

Similar circumstances prevail during discharge of a pressure chamber with a subsequent build-up of a vacuum. Here during opening of a valve a falling-off of the pressure peak is obtained relatively quickly, while falling-off of the pressure beyond that of the atmosphere, and a subsequent build-up of a vacuum can only be accomplished at a relatively high expenditure of energy, or, in the event a blower is used, by the process time being considerably extended.

A pressure chamber of this type can serve both for the storage of compressed air and compressed gases, as well as for the separation of liquid materials from solid materials.

Thus there are known, for example, devices for separating solid materials from liquid materials, which include a rotatably supported press container, which is partitioned by a flexible membrane into a pressure chamber and a pressing space, and wherein an inlet is associated with the pressure chamber for passing a pressure medium thereinto, and an outlet is associated with the pressing space for a liquid to be squeezed out therefrom, and wherein the pressure chamber is filled with compressed air obtained from a compressor until attainment of the compression pressure.

Experience has shown that in an arrangement of this type a third of the air volume to be introduced into the pressure chamber for the purpose of squeezing out a compressible agricultural product such as a mash is required just to shift the membrane normally abutting the container wall under vacuum from that wall to the mash, so that the membrane makes contact with the mash.

Compression of air by means of a compressor, for the purpose of causing the membrane to abut an agricultural product such as a mash, is not sufficiently efficient, and it is equally unsatisfactory to draw or suck off any remaining air from the pressure chamber by means of a blower following normal discharge of air therefrom.

This also applies for filling or discharge of a pressure chamber for storage therein of gases or of air.

If desired, such devices can be provided with an additional blower, which takes over the task of causing the membrane to abut the mash; devices using such features are known in practice. Hence it is possible to obtain an inlet pressure, and suctioning off of the air from the pressure chamber, while expending less energy than hitherto. A disadvantage here, however, is the longer operating time, which is increased based on several operating cycles.

SUMMARY OF THE INVENTION

It is consequently an object of the invention to devise a method and an apparatus for the filling and discharge of pressure chambers for the dual purposes of accelerating air or gas exchange, and for saving operating costs, so as to improve their economic performance.

This object is attained, according to the invention, by either filling the pressure chamber by means of a compressor, and/or discharging the pressure chamber with the additional aid of a pump, such as a stream pump, which in turn communicates with the pressure chamber.

BRIEF DESCRIPTION OF THE DRAWING

For a fuller understanding of the nature and objects of the invention, reference should be had to the following detailed description, taken in connection with the accompanying drawings, in which.

DESCRIPTION OF THE PREFERRED EMBODIMENTS

Figure 1:
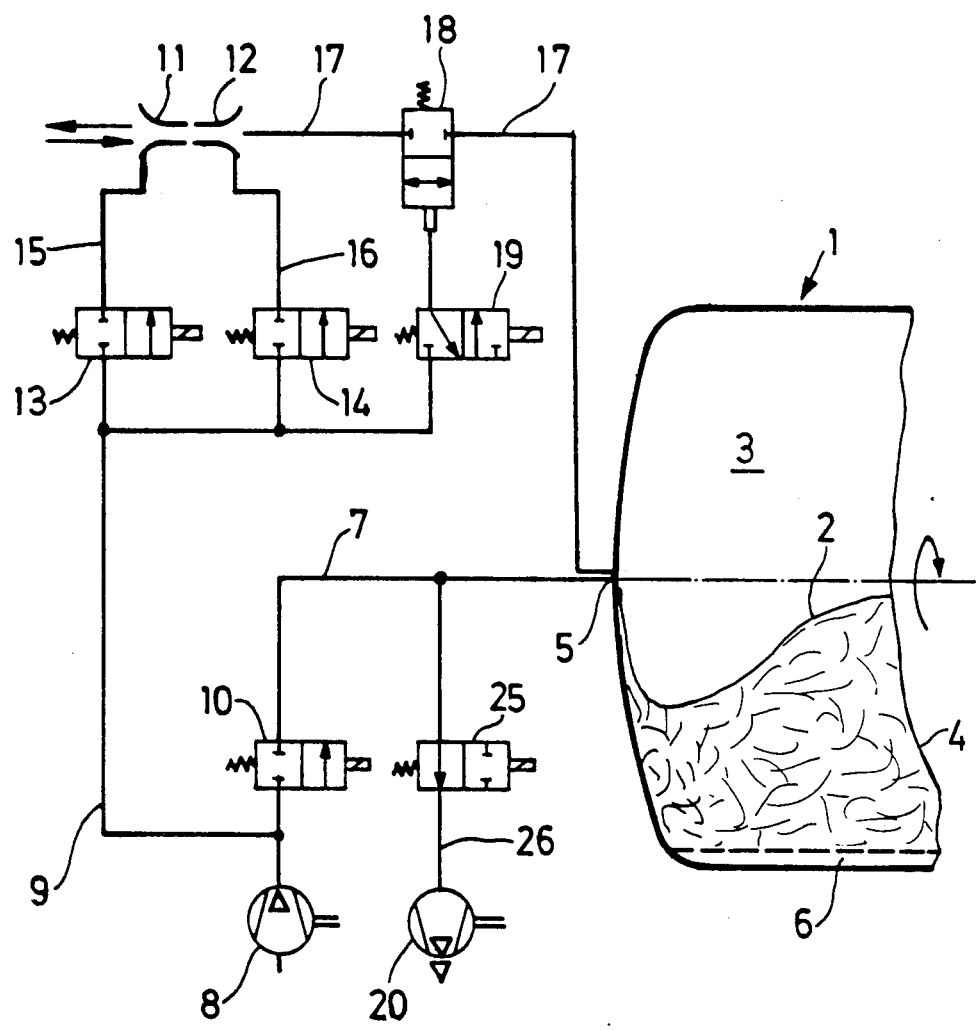
FIG. 1 is a schematic block diagram of the device, according to the present invention.

Referring now to the drawing, in FIG. 1, there is shown a rotatably supported press container 1 mounted on a frame; the press container 1 is subdivided by a flexible membrane 2 into a pressure chamber 3, and a pressing space or squeezing compartment 4. The pressure chamber 3 is provided with an inlet 5 for a pressure medium, and the pressing space 4 is provided with an outlet or discharge conduit 6 for the liquid to be squeezed out therefrom.

The pressure chamber 3 communicates with a compressor 8 through a main or inlet conduit 7, through which the compressed air passes. A control conduit 9 for the compressed air is coupled to the main conduit 7 at a junction of the main or inlet conduit 7 with the compressor 8. Downstream of the compressor 8 there are disposed shut-off means, such as a shut-off member 10. Passage of the pressure medium into the pressure chamber 3 is accomplished through a (non-illustrated) rotatable inlet.

Air or gas pumping means, such as two stream pumps 11 and 12 are disposed in the circuit of the control conduit 9, which, in turn, communicates with the pressure chamber 3. The pressure stream pump 11 serves to fill the pressure chamber 3, while the vacuum stream pump 12 serves to discharge the pressure chamber. For alternating operation of the stream pumps 11 and 12, the control conduit 9 for compressed air is subdivided, or branches out into two parallel segments 15 and 16, associated with the stream pumps 11 and 12, respectively; the segments 15 and 16 are in turn provided with alternately operating shut-off valves 13 and 14, which cooperate with one another. The stream pumps 11 and 12 are so constructed that their outlets, or downstream openings, communicate with one another. So as to attain an optimal efficiency, the stream pump 11 required to fill the pressure chamber 3 is located nearer to the compressor 8 in the control conduit 9 than pressure the stream pump 12. The stream pump 11, based on its construction, which will be explained in further detail in connection with FIG. 2, draws in air from the atmosphere and consequently generates thereby relatively large volumes of air, which are destined to fill the pressure chamber 3.

The vacuum stream pump 12 is provided to discharge a certain amount of remaining air from the pressure chamber 3, and is located closer to the pressure chamber 3 than filling stream pump 11, which is required to fill that pressure chamber.

A pump conduit 17 for filling the pressure chamber 3 with compressed air or gas, or discharging air or gas from the pressure chamber 3 includes shut-off means, such as a shut-off element or valve 18, which is maintained open when the stream pumps 11 and 12 are operating. Operation of the shut-off element or valve 18 can be accomplished by means of a switching valve 19 operable through the control conduit 9.

In order to connect the pump conduit 17 to the pressure chamber 3, the rotatable inlet represented by the main inlet conduit 7 is made use of.

In order to further lower the operating costs a blower 20 communicates with the main inlet conduit 7 during the pressure-chamber filling phase, or during the mash-loosening phase, when generating a vacuum in the pressure chamber 3. A connecting conduit 26 connected between the main inlet conduit 7 and the blower 20 can be closed by valve 25, if needed, namely during filling of the pressure chamber 3 with air or gas from any suitable source such as the atmosphere.

Figure 2:
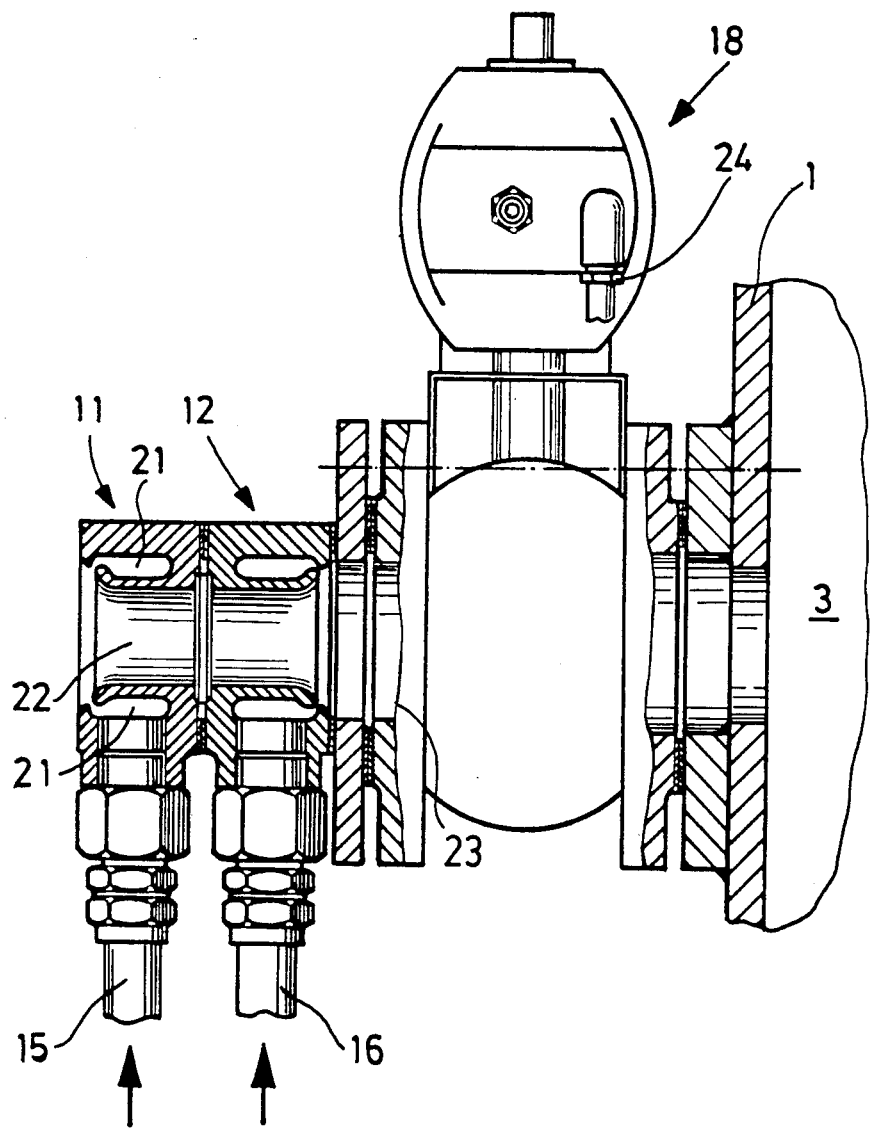
FIG. 2 is a cross-section through the stream pump.

In FIG. 2 there is shown a an embodiment of the stream pumps 11 and 12 as used, for all intents and purposes, in practice; FIG. 2 also shows how the stream pumps are disposed, together with the shut-off valve or element 18, on the press container 1. The stream pump 11 used to fill the pressure chamber 3 communicates with a segment 15 of the control conduit 9 for the compressed air. The compressed air enters a ring-shaped distributor 21, and passes therefrom through an annular nozzle 22, in which it is rerouted, through an outlet 23 into the pressure chamber 3. During this process a low or under-pressure zone arises in the annular nozzle 22, through which the surrounding air is drawn in, and wherefrom it is passed through the outlet 23 into the pressure chamber 3.

During discharge of the pressure chamber 3 the stream pump 12 communicating with the segment 16 of the control conduit 9 is operated by compressed air from the compressor 8, while the stream pump 11 remains motionless without any compressed air being supplied thereto. A volume of air still remaining in the pressure chamber 3 following discharge thereof is suctioned off from the pressure chamber 3 by means of the stream pump 12.

As has already been mentioned before, after a certain pressure has been reached in the pressure chamber 3, the stream pump 11 is shut off, and the shut-off element 18 is closed. Closure of the shut-off element 18 is accomplished in a self-actuating manner by means of force-storage means, such as a spring, while the shut-off element 18 is opened by means of the switching valve 19 connected to the control conduit 9.

The stream pumps 11 and 12 are connected tightly, on one hand, to the shut-off element 18, such as a stopcock, which, in turn is secured to the flanges of the press container 1, and are connected tightly, on the other hand, to the control conduit 9. No special provisions for mounting are made. Element 24 is a connector serving to connect a conduit passing compressed air to the stopcock 18 for the actuation thereof.

Operation

In a device for separating liquid materials from solid materials by means of a press of the aforedescribed kind, the device, following preliminary dejuicing of the press filled with mash, operates as follows:

Starting from a state of the press being filled with mash, the press cycle commences after dejuicing, namely the shut-off member 10 is closed, the compressed air from the compressor 8 streams through the control conduit 9, and through the open shut-off valve 13 into the stream pump 11, while the shut-off valve 14 is closed. The stream pump 11 draws in air from the atmosphere, which passes into the pump conduit 17, while being mixed with the compressed air from the compressor 8, and passes therefrom through the open shut-off element 18 into the pressure chamber 3 of the press-container 1, the switching valve 19 having been actuated to open the shut-off element 18. The membrane 2 is thereby detached from the wall of the press-container 1, and is caused to abut the mash.

For this process designated as a first phase or stage in the press cycle, about 33% of the total air volume, needed for the pressing operation at a pressure of about 2 bars, is required.

Referred to the compressed air volume generated by the compressor, about 20% of the required pre-filling volume is supplied by means of the stream pump for the preliminary filling of the pressure chamber.

So as to aid this filling process, the blower 20 can be used to operate in a direction opposite to the direction indicated, be it through a change in the direction of rotation, or through a change of the arrangement of the conduit.

When, following a signal from the pressure chamber, a certain pressure in the pressure chamber 3 has been attained, the shut-off element 18, and optionally a pushing valve 25, as well as the shut-off valve 13, are closed, the shut-off valve 14 being already closed. The air compressed by the compressor 8 now passes through the shut-off member 10, which has in the meantime been opened, to the pressure chamber 3, and initiates pressing of the mash contents by building up the pressure in the pressure chamber 3.

Following a predetermined dwelling time of the membrane 2 under pressure, the pressure chamber 3 is again relieved from pressure or stress by discharge of the compressed air therefrom. By opening of the pushing valve 25, the air or gas streams off to the atmosphere through line 20 and the blower 20.

In order to shorten the air or gas discharge time, the shut-off element or valve 18 could also be opened, so that the air can then stream off from the pressure chamber 3 through the stream pump 11 to the atmosphere.

Prior to the passage of atmospheric pressure into the pressure chamber 3, or at an overpressure of about 0.2 bars, the shut-off member 10, and the shut-off valve 13 are closed, while the shut-off valve 14 and the shut-off element or valve 18 are opened, the shut-off valve 18 being opened with the aid of the switching valve 19. The compressed air from the compressor 8 now reaches the stream pump 12, which draws off any remaining air volume from the pressure chamber 3, and passes it to the atmosphere. For this purpose the blower 20 is also made operative, and after a given reduced pressure has been reached in the pressure chamber 3, the stream pump 12 is switched off, and the shut-off valve 14, as well as the shut-off element are closed.

Subsequently a pre-set, reduced pressure triggers the loosening phase of the membrane, during which loosening phase the press-container 1 is rotated.

These operating cycles are repeated several times according to a programmed process control.

It would, of course, also be possible to carry out the principles of the process without any particular additional measures by means of a liquid pressure medium.

It is to be understood that it is not desired that the present invention be limited to the exact details of construction shown and described, for obvious modifications will occur to a person skilled in the art.

Having thus described the invention, what is claimed as new and desired to be secured by Letters Patent is as follows:

1. A cyclical method for accelerating air or gas exchange in a press container having a pressure chamber separated from a pressing space by a membrane with the aid of compression means, discharge means, and pressure and vacuum pumping means, comprising operating said compression means to produce compressed air or gas, operating said pressure pumping means to mix air or gas from an external source with said compressed air or gas from said compression means, introducing said mixed air or gas through a pump conduit into said pressure chamber to move said membrane against solid material in said pressing space, closing off said pump conduit from said pressure chamber, introducing compressed air or gas from said compression means through a main conduit into said pressure chamber thereby to exert pressure on said solid material and to separate liquid from said solid material, closing off said main conduit from said pressure chamber, opening said pump conduit, and operating said compression means and said vacuum pumping means in conjunction with each other to discharge air or gas from said pressure chamber thereby to move said membrane away from said solid material.

2. The method of claim 1, further comprising introducing said mixed air or gas into said pressure chamber until a predetermined pressure is reached in said pressure chamber prior to closing off said pump conduit.

3. The method of claim 2, further comprising opening said pressure chamber to the atmosphere prior to operating said compression means and said vacuum pumping means in conjunction with each other to discharge air or gas from said pressure chamber.

4. The method of claim 1, further comprising operating blowing means connected to said pressure chamber to aid in filling and discharging said pressure chamber.

5. An air or gas exchange system, comprising a cyclically operable press container having a membrane dividing said press container into a pressure chamber and a pressing space, comprising compression means for producing compressed air or gas, pressure pumping means for mixing air or gas from an external source with said compressed air or gas from said compression means, vacuum pumping means for operating in conjunction with said compression means to evacuate air or gas from said pressure chamber, pump conduit means connecting said pressure and vacuum pumping means to said pressure chamber, said pump conduit means conveying said mixed air or gas into said pressure chamber and discharging said air or gas from said pressure chamber.

first shut off means disposed in said pump conduit means, main conduit means connecting said compression means to said pressure chamber, said main conduit means conveying compressed air or gas from said compression means into said pressure chamber, second shut off means disposed in said main conduit means, said first and second shut off means being selectively actuable, whereby said system is operable through cycles of filling said pressure chamber with said mixed air or gas, filling said pressure chamber with compressed air or gas, and discharging said air or gas from said pressure chamber.

6. The air or gas exchange system of claim 5, further comprising control conduit means connecting said compression means to said pressure and vacuum pumping means, and third shut off means disposed in said third conduit means between said compression means and said pressure and vacuum pumping means, said third shut off means being selectively actuable in cooperation with said first and second shut off means to operate said system through said cycles.

7. The air or gas exchange system of claim 6, wherein said control conduit means includes first and second conduit segments connecting said compression means to said pressure pumping means and said vacuum pumping means respectively.

8. The air or gas exchange system of claim 7, wherein said third shut off means comprises first and second shut off elements disposed in said first and second conduit segments respectively.

9. The air or gas exchange system of claim 5, wherein said pressure pumping means is disposed nearer to said compression means than said vacuum pumping means.

10. The air or gas exchange system of claim 5, further comprising blowing means connected to said pressure chamber, said blowing means operable to aid in filling and discharging said pressure chamber.

11. The air or gas exchange system of claim 10, further comprising connecting conduit means connecting said blowing means to said main conduit means downstream of said compression means, and fourth shut off means disposed in said fourth conduit means, said connecting shut off means being selectively actuable to cooperate with said other shut off means to aid in operating said system through said cycles.

12. A press for dejuicing agricultural products, comprising a frame, a press container mounted on said frame, separating means for separating liquid material from solid material, said separating means being at least partially disposed in said press container, and including a membrane partitioning said press container into a cyclically operable pressure chamber and into a pressing space, outlet means for said liquid material, compression means for at least partially compressing air or gas, discharge means for discharging the compressed air or gas from said pressure chamber so as to move said membrane at least partly away from said solid material in a loosening cycle, pressure and vacuum pumping means communicating with an external source of air or gas, pump conduit means connecting said pressure and vacuum pumping means to said pressure chamber, first shut off means disposed in said pump conduit means between said pumping means and said pressure chamber, main conduit means connecting said compression means to said pressure chamber, second shut off means disposed within said main conduit means between said compression means and said pressure chamber, said second shut off means being selectively actuable for selectively passing compressed air or gas through said main conduit means into said pressure chamber so as to introduce compressed air or gas into said pressure chamber in a press cycle, said compressed air or gas thereby exerting pressure on said membrane so as to squeeze out and discharge said liquid material from any solid material disposed in said pressing space through said outlet means, control conduit means connecting said compression means to said pressure and vacuum pumping means, and third shut off means disposed in said control conduit means between said compression means and said pressure and vacuum pumping means, said first and third shut off means being selectively actuable so that said pressure and vacuum pumping means copperate with said compression means and said discharge means to accelerate filling of said pressure chamber with compressed air or gas during a filling cycle, and to accelerate discharge of the compressed air or gas from said pressure chamber during said loosening cycle.

13. The air or gas exchange system of claim 12, wherein said control conduit means includes first and second conduit segments connecting said compression means to said pressure pumping means and said vacuum pumping means respectively.

14. The air or gas exchange system of claim 13, wherein said third shut off means comprises first and second shut off elements disposed in said first and second conduit segments respectively.

15. The air or gas exchange system of claim 12, wherein said pressure pumping means is disposed nearer to said compression means than said vacuum pumping means.

16. The air or gas exchange system of claim 12, further comprising blowing means connected to said pressure chamber, said blowing means operable to aid in filling and discharging said pressure chamber.

17. The air or gas exchange system of claim 16, further comprising connecting conduit means connecting said blowing means to said main conduit means downstream of said compression means, and fourth shut off means disposed in said connecting conduit means, said fourth shut off means being selectively actuable to cooperate with said other shut off means to aid in operating said system through said cycles.

* * * * *